United States Patent Office 3,632,701
Patented Jan. 4, 1972

3,632,701
CONDITIONING OF TIRES TO IMPROVE UNIFORMITY
James J. Devitt, Rudy D. Henson, and Thomas E. Powell, Mayfield, Ky., assignors to The General Tire & Rubber Company
No Drawing. Continuation-in-part of abandoned application Ser. No. 874,686, Nov. 6, 1969. This application Aug. 6, 1970, Ser. No. 61,818
Int. Cl. B29c 25/00
U.S. Cl. 264—40
12 Claims

ABSTRACT OF THE DISCLOSURE

The dynamic radial force variations generated in a cured pneumatic passenger or truck tire are often sufficiently great that they adversely affect the riding characteristics of the tire. In a large percentage of tires, the excessive radial force variations can be reduced by heating all or part of a tire while supported vertically and positioned so that the area of maximum force is located in the top quadrant of the tire. The tire is preferably heated to a temperature of between 150° to 280° F. for a period of time that is sufficient to reduce the force but not otherwise degrade the tire. Typically a time of 60 minutes or less at an inflation pressure of 0 to 50 p.s.i. is adequate. A suitable source such as a pot heater, rubber kiln, or infrared heat may be used for heating. The invention is applicable to nearly all types of tires including radial, belted bias and bias tires containing rayon, nylon or polyester cords.

RELATED APPLICATIONS

This application is a continuation-in-part of earlier filed patent application Ser. No. 874,686, filed Nov. 6, 1969 and now abandoned.

BACKGROUND OF THE INVENTION

There are a multitude of variables that are encountered in the construction of pneumatic tires. Some of these are dimensional irregularities, changes in the physical and dimensional characteristics of the calendered fabrics, the thickness, placement and overlapping of the various splices in the tire, the larger number of different compounds and materials which are employed in the manufacture of the tire, human errors such as the inaccurate centering of the tread and breakers and the use of uneven stitching pressures, and variations that arise during vulcanization of the tire such as dimensional irregularities in the mold and non-uniform curing temperatures. All of these variables, either singularly or through interaction with one another have an adverse effect on the static and dynamic properties of the finished tire.

Many attempts have been made to correct or to compensate for these unbalances and irregularities. For example, a small amount of weight is often added to the tire or to its associated rim to compensate for non-uniformity in the weight of the tire. Attempts have been made to produce a perfectly round or concentric tire by machining or grinding the tread of the tire. Many other schemes and devices have been developed and used to improve the qualitative and quantitative aspects of tires, but with only marginal success.

More recently, a machine called a tire uniformity machine has been developed to measure, under dynamic conditions, variations in the force exerted by a tire rotating against a surface. In this machine, a tire is mounted on a rotatable axle and is inflated. The tire is then freely rotated against a drum, the shaft of which is attached to appropriate strain gauges or transducers. As the tire rotates against the drum the force exerted on these strain gauges is measured and is relayed to an appropriate recording or readout device. The strain gauges can be used to measure among other things, the radial force, i.e. those forces acting through the tire parallel to the wheel plane direction and lateral forces, i.e. those acting in an axial direction perpendicular to the wheel plane.

Tests with the various types of uniformity machines have revealed that variations in the radial forces around the tire constitute an important factor in the particular problem of tire uniformity and ride characteristics associated therewith. It has recently been discovered that radial and lateral non-uniformity can be offset by the removal of an incremental amount of rubber from the shoulder rib of the tire in the area of greatest non-uniformity. Details of the process and a machine for accomplishing the compensation are described in co-pending application S.N. 613,252 filed on Feb. 1, 1967 and owned by the assignee of the present invention and now abandoned. Although compensation for non-uniformity normally improves the ride characteristics of the tire, it has certain definite drawbacks. For example, in some tires the non-uniformity is so great that a substantial amount of rubber must be removed. Further, the rubber removal is a compensation for, not a correction of, the non-uniformity. As an alternative to the removal of rubber, a tire having an excess amount of radial force variation must be scrapped or sold at a lower price. This type of tire is structurally sound but because of its lack of aesthetic quality it cannot command a premium price, nor can it be used as original equipment on new automobiles.

Many of today's tires have a carcass that is composed of a skim coated fabric of nylon or polyester cords. These two synthetic fibers have properties which make them quite suitable for use in pneumatic tires. However, it has been observed that, after a tire is vulcanized nylon and polyester cord both tend to shrink upon cooling and thereafter tend to slowly elongate while the tire is in service. This often causes tread cracking and a premature degradation of the tire. In U.S. Pat. No. 3,002,228, Salem et al. state that the shrinking of the cords can be minimized by slowly cooling the tire while maintaining the internal pressure thereof. This is done in the curing press, or alternatively, the tire is removed from the press and is mounted on an inflation rim where it is allowed to cool while inflated. This procedure is generally referred to as post cure inflation. In many instances, tests on a time uniformity machine show that post cure inflation has a definite adverse effect on tire uniformity. Thus, this procedure reduces the problem of cord shrinking and subsequent elongation in service, but at the same time adversely increases the problem of tire non-uniformity.

It has further been postulated that temperature gradients and other variables that arise before, during or after the curing cycle of any tire introduce thermally induced structural aberrations in the tire including stress build-up in the tire cords due to differential shrinkage of the cords upon cooling. These factors all contribute to excessive radial force variations in the tire.

BRIEF DESCRIPTION OF THE INVENTION

It is an object of the present invention to improve the riding characteristics of pneumatic passenger and truck tires.

Another object is to reduce the amount of tread that must be removed in those tires that require compensation for non-uniformity.

Yet another object is to reduce the magnitude of the radial force variations that are caused by thermally induced non-uniformities within a tire.

Still another object of the invention is the use of a special and unusual heat treating operation, after the tire uniformity has been measured, to reduce the magnitude and the effect of the non-uniformity.

These and other objects are accomplished in the manner to be hereinafter more fully described by locating the area of the tire having the maximum radial force, supporting the tire in the vertical position with the area of maximum force located in the top quadrant of the tire, and subjecting the tire or a portion thereof to a heat treatment at a temperature and for a time sufficient to reduce the magnitude of the peak-to-peak or first harmonic radial force variation thereof. Temperatures for 150° to 280° F. for a period of 5 or 10 minutes to 60 minutes at an inflation pressure of 0 to 50 p.s.i. have been found to be adequate.

DETAILED DESCRIPTION OF THE INVENTION

In more detail, a pneumatic tire is built, and is thereafter vulcanized under pressure in a conventional tire curing press at a temperature of between about 290° and 350° F. Upon removal from the curing press, the tire may be immediately reinflated on a tire rim of the type shown for example in FIG. 2 of the aforementioned Salem et al. patent after which it is allowed to cool to a temperature below 210° F. while maintained at an internal pressure of about 50 p.s.i. As previously stated, this post-cure inflation reduces the tendency of the cord to shrink upon cooling and to re-elongate during the life of the tire. The use of post-cure inflation has a further advantage in that it reduces the dwell time of the tire in the curing press, thus permitting more efficient utilization of the press. Typically, this process is used on tires containing synthetic fibers such as nylon and polyester but is not normally needed on rayon tires.

After the completely vulcanized tire has been cooled to a temperature below 210° F., it is mounted on a tire uniformity machine such as the Model 60 Tire Uniformity Grading Machine sold by the Akron Standard Mold Division of Eagle Picher Corporation. In this machine, the tire is inflated and is pressed against a road wheel at a predetermined static load after which the tire is rotated at a uniform speed of e.g. 60 r.p.m. During rotation, the distance between the tire axis and the axis of the drum remains constant. Radial force transducers connected to the drum shaft produce a signal that is proportional to the continuously varying force that is exerted by the tire against the drum during rotation and this signal is properly indexed or correlated to determined the exact location on the periphery of the tire where the maximum force is generated. This location is marked, for example, by placing a dot on the sidewall of the tire between the location and the tire axis. This marking may be done manually or automatically. By appropriate conditioning of the signal from the trandsucers, the maximum composite force (often referred to as peak to peak variation), composed of the summation of all of the radial harmonic forces generated at a given location in the tire can be measured and marked; alternatively, the peak of the first harmonic curve, which is the principal contributing factor to the composite force variations curve, can be located and its position marked on the tire. The location of this first harmonic peak is often referred to as the phase angle.

With the high point of the uniformity curve, either the composite curve or the first harmonic curve, marked on the tire, the tire is then placed on a rim, hook or pin rack with the marked point of the tire, representing the maximum force, at the top of the tire and is then heated in a vertical position for a period of time sufficient to reduce the magnitude of the maximum force variations. The tire may be inflated to a pressure no greater than about 50 p.s.i. during heating, which is typically carried out in a steam autoclave, hot air kiln or an infrared oven.

It has been found that both the magnitude of the peak to peak radial force variation, and the value of the first harmonic curve of a large percentage of tires can be reduced by heating tires at a temperature below the degradation temperature of the tire for a period of time sufficient to relieve the cord stresses. For polyester and nylon cord tires, a desired temperature range is between 150° F. and 260° F., although some improvement is discernible at room temperature and temperatures as high as 280° F. can be briefly tolerated. In the desired temperature range, a treatment time of between about 10 and 40 minutes is generally satisfactory. The amount of improvement, even with longer treatment times, becames less noticeable at temperatures below about 180° F. Within the desired range, temperatures of about 230° to 260° F., comparable to those used to spot repair tires, are preferred.

Rayon cord tires can be heat treated at higher temperatures than tires of polyester or nylon cord without any severe degradation. In fact, rayon, because of its greater heat stability and resistance to thermal change, requires a more severe heat treatment in order to reduce force variations, and temperatures of 275° F. for 30 to 60 minutes are not uncommon in the practice of the present invention.

Although the tire may be hung on a hook or a pin rack during the heat treatment, more uniform results are obtained if the tire is mounted on rims, such as those used during the post cure inflation of the tire. Furthermore, rims are essential if the tire is to be inflated during the heat treatment.

The followng examples are presented to further illustrate the advantages of the present invention.

EXAMPLE I

A series of bias ply passenger car tires each having a carcass composed of two plies of calendered rayon fabrics, were cured in a standard tire curing press and were removed from the press at an average temperature of between 310° F. and 320° F. The tires were then placed on an inflation rim except as noted in Table I, were inflated to 50 p.s.i. and were allowed to cool to a temperature of about 200° F. They were then removed from the inflation rim and were checked for radial and lateral uniformity on an ASM Model 60 Tire Uniformity Grading Machine. A suitable mark was placed on the sidewall of each tire at the location of the phase angle, i.e. the peak of the radial first harmonic curve. Those tires having a maximum first harmonic force variation of less than 20 pounds were labeled grade A, thus indicating that they required no correction or adjustment. Those tires having a maximum first harmonic force variation between 20 and 40 pounds were given a B grading and those above 40 pounds were given a C grading. The B grade tires were those that could normally be improved to a grade A by grinding or removing a small amount of rubber from the tread area of the tire while the non-uniformity of those that were labeled C was considered to be too great to correct by grinding within a reasonable length of time.

After the tires were marked, they were placed upright in a pot heater and were heated at a temperature of 220° to 280° F. for periods of 10 to 20 minutes with the results shown on Table I. The tires were not inflated during the heat treatment.

The table readily shows that heating the tires at temperatures between 220° and 280° F. for periods of time ranging from 10 to 20 minutes has a very pronounced effect upon the uniformity of the tire. The heat treatment of the tires placed in a vertical position with the phase angle at the top of the tire improved the uniformity in nearly all instances where the tires had been previously subjected to post inflation after curing. (See Runs 4,5,7,8 and 9.) As shown in Run 6, however, where the rayon tires were not post inflated, there was no appreciable improvement. The tires in Runs 1 and 2 show no particular improvement while the uniformity of three tires in Run 3 typically became worse.

A number of these tires, selected at random, were subjected to routine pulley wheel tests as well as endurance

TABLE I.—RAYON TIRES

| Run No. | No. of tires | Time (minutes) | Temp., °F. | Location of dot | Uniformity grade before | | | Uniformity grade after | | |
|---|---|---|---|---|---|---|---|---|---|---|
| | | | | | A | B | C | A | B | C |
| 1 | 15 | 15 | 280 | Random | 9 | 6 | | 8 | 3 | 4 |
| 2 | 15 | 10 | 280 | do | 15 | | | 9 | 6 | |
| 3 | 3 | 10 | 280 | Bottom | 1 | 1 | 1 | | | 3 |
| 4 | 10 | 10 | 280 | Top | | 4 | 6 | 4 | 3 | 3 |
| 5 | 13 | 20 | 280 | Top | 5 | 8 | | 11 | 2 | |
| 6[1] | 18 | 15 | 280 | Top | 14 | 4 | | 15 | 3 | |
| 7 | 32 | 15 | 260 | Top | | | 32 | 23 | 6 | 3 |
| 8 | 14 | 15 | 240 | Top | | | 14 | 8 | 2 | 4 |
| 9 | 36 | 15 | 220 | Top | | 36 | | 26 | 8 | 2 |

[1] Not post inflated after curing.

and high speed test. The tires were found to be generally comparable in performance to control tires that had not been subjected to our novel heat treatment after curing and post-cure inflation. It is significant that in many instances, tires that were unacceptable (grade C) for grinding were sufficiently improved when subjected to the heat treatment of the present invention that they were upgraded to a grade B or grade A.

EXAMPLE II

A second series of experiments involved several G78-14 and G78-15 belted-bias tires constructed with two carcass plies of calendered polyester fabric and two inextensible fiber glass belts. The tires were cured for 15 minutes with 185 p.s.i. steam, hot water and cold water. The tires were then removed from the press and were instantly post inflated on an inflation rim for about 30 minutes. They were then removed from the rim and were tested for uniformity on a uniformity machine. In Runs 10–14 the tires were placed back on a rim, after which they were inflated to 50 p.s.i. and were heated in a pot heater. After removal from the heater, they were allowed to cool while inflated to prevent shrinkage of the cords. In Runs 15 and 16 the tires were not inflated during the heat treatment and were hung on a pin rack in a rubber kiln instead of a pot heater. As can be seen from Table II, the heat treatment improved the average values of the radial force variations when the tires was positioned vertically with the area of maximum non-uniformity located at the top. Conversely, when the area of maximum non-uniformity was at the bottom of the tire, the uniformity of the tire generally became worse. It should also be noted that an increase in temperature resulted in a corresponding increase in the degree of improvement.

EXAMPLE III

In a further experiment, 16 belted-bias tires of the same construction as those tested in Example II were tested and were found to have an average peak to peak radial force variation of 33.1 pounds and an average maximum first harmonic variation of 19.3 pounds. These were suspended vertically at room temperature for a period of 24 hours. One group of eight tires was suspended with the point of maximum force in the uppermost position while a second group of eight tires was suspended with the area of maximum force located at the bottom of the tire. These tires were retested at the end of the 24-hour period on the tire uniformity machine. The peak to peak radial force variation of the tires in the first group was reduced to an average value of 30.8 while the average value of the first harmonic was reduced to 17.7. Six of these eight tires showed some improvement in uniformity. Conversely, the average peak to peak value of the second group fo eight tires increased to 34.5 while the first harmonic increased to 20.2 pounds. The uniformity of all eight tires of the second group became worse. From these results, it can be seen that even at lower temperatures the benefits of the invention can be appreciated. However, the timer required to improve a tire an incremental amount becomes appreciably greater at room temperature. Accordingly, it is normally contemplated that the invention will be practiced at elevated temperatures where the benefits thereof can be obtained much in shorter times.

EXAMPLE IV-A

Further tests were carried out on a large number of belted-bias tires in which the carcass plies are composed of polyester cords and the circumferential belt around

TABLE II

| | | | | | | Radial force | | | | | |
|---|---|---|---|---|---|---|---|---|---|---|---|
| | | | | | | Peak to peak | | | First harmonic | | |
| Run No. | No. of tires | Time (minutes) | Temp., °F. | Pressure | Position of dot | Before | After | Percent improvement | Before | After | Percent improvement |
| 10 | 4 | 30 | 240 | 50 | Down | 37.5 | 43 | −14.7 | 18 | 24.5 | −36 |
| 11 | 15 | 30 | 240 | 50 | Up | 47.3 | 33 | 30 | 28 | 14.2 | 49 |
| 12 | 10 | 20 | 240 | 50 | Up | 39.1 | 31.9 | 18.4 | 21.5 | 13.5 | 37 |
| 13 | 5 | 30 | 200 | 50 | Up | 36.6 | 34.8 | 5 | 16 | 15.8 | 1 |
| 14 | 5 | 60 | 200 | 50 | Up | 43.8 | 32.4 | 26 | 29 | 15.8 | 45 |
| 15 | 15 | 15 | 180 | None | Up | 36.9 | 33.6 | 9 | 21.1 | 13.8 | 35 |
| 16 | 5 | 15 | 180 | None | Down | 37.8 | 41.2 | −12 | 25.6 | 30.6 | −20 |

A substantial number of these belted-bias tires were subjected to various endurance, strength and high speed tests were found to be comparable in these respects to the control tires that had not undergone heat treatment.

the carcass is composed of fiber glass. The purpose of these tests was to determine the preferred conditions for heat treating this type of tire. Before the test, these tires were all cured in the conventional manner and were all subjected to post-cure inflation on conventional inflation rims. These tests involved heat treating different groups of 10 tires each, mounted on rims and supported vertically in a horizontal pot heater with the phase angle at the top of the tire. Different groups were treated at temperatures of 150°, 200° F., and 250° F., uninflated and inflated to 50 p.s.i., and for time periods of 15 and 30 minutes. Radial force measurements, made on the tires before and after the heat treatment showed average statistical changes in the forces as follows:

TABLE III

|  | Radial peak-peak (lbs.) | Radial first harmonic (lbs.) |
|---|---|---|
| Temp. (° F.): |  |  |
| 150 | −.43 | −1.02 |
| 200 | −3.53 | −4.30 |
| 250 | −4.05 | −7.75 |
| Time (minutes): |  |  |
| 15 | −2.67 | −4.50 |
| 30 | −2.67 | −4.21 |
| Pressure (p.s.i.): |  |  |
| 0 | −2.97 | −5.11 |
| 50 | −2.37 | −3.60 |

From these results it can be seen that for this type of tire there is very little difference in result between heat treating the tire for 15 minutes as opposed to 30 minutes and that there is a slight advantage to heating the tire while uninflated rather than while inflated. It is clear that the improvements in force variation are dependent upon the heat treating temperature. For example, it was found that there was a 9% and a 33% average improvement in the peak to peak and first harmonic forces at 250° F. as compared with a .6% and 4.3% improvement at 150° F. with 90% of the tires showing some improvement at the higher temperature as opposed to 55% at the lower temperature. This improvement obtained at higher temperatures, however, must be balanced against the loss of desirable characteristics which might result from heat treating the tire to a temperature sufficiently high to cause degradation of the cord or the rubber in the tire.

EXAMPLE IV-B

Additional groups of litres of this same size and type were tested uninflated at 250° F. for 15 minutes with the tire in the vertical position, but with the point of maximum radial force variation positioned at 45°, 90° and 180° from the top. These results all confirm that instead of reducing the force variation of the tire, the heat treatment undesirably increased the magnitude of the peak to peak and the first harmonic radial force variations. Furthermore, these conditions became progressively worse as the location of the maximum force was moved toward the bottom of the tire. Further tests show that the benefits of the present invention are largely dissipated if the tire is tilted as much as 30° from the vertical portion even though the maximum force variation is located at the top of the tire.

EXAMPLE V

Tests similar to those described in Example IV-A were run on belted-bias tires containing four carcass plies of rayon and two inextensible belts of fiber glass. The results of these tests are shown on Table IV below.

TABLE IV

|  | Radial peak-peak (lbs.) | Radial first harmonic (lbs.) |
|---|---|---|
| Temp. (° F.): |  |  |
| 150 | −2.97 | −3.00 |
| 200 | −6.43 | −6.93 |
| 250 | −7.18 | −7.50 |
| Time (minutes): |  |  |
| 15 | −5.23 | −5.58 |
| 30 | −5.81 | −6.16 |
| Pressure (p.s.i.): |  |  |
| 0 | −6.38 | −7.30 |
| 50 | −4.67 | −4.30 |

Again it was found that the beneficial efforts of the treatment increased as the heat treating temperatures were progressively raised from 150° to 250° F. and that the treatment was better on uninflated than on inflated tires. The 30 minute heat treatment appeared to be slightly better than the treatment for 15 minutes.

Additional tests on these rayon/fiber glass tires at 250° for 15 minutes and at 0 inflation pressure showed the tires to be less sensitive to minor changes in the location of the maximum radial force than the comparable tires containing polyester tire cords. For example, it was found that the rayon tire can be rotated so that the location of the maximum radial force is nearly 90° from the vertical before the maximum values begin to increase rather than decrease. The same is true when the tire is tilted from the vertical position during heat treatment, while the point of maximum force remains at the top of the tire. For example, in 10 rayon tires heated at 250° F. for 15 minutes there is an average decrease of 9.0 to 9.4 pounds in the radial peak to peak and radial first harmonic force variations at 0° tilt. At 30° tilt, the average decrease was 8.2 and 10.10 pounds respectively for peak to peak and first harmonic, while tilting the tire 90° from the vertical resulted in an average decrease of 3.2 pounds and 0.1 pound for peak to peak and first harmonic. Thus, the advantages of the invention are largely canceled out at 90°. This is contrasted with the polyester tire wherein these advantages are largely lost when the tire is tilted as much as 30° from the vertical.

EXAMPLE VI

Two dozen 185-R-14 radial ply tires each composed of two carcass plies of rayon and having a cured cord angle of about 90° and four inextensible breakers, each forming equal but opposite angles of 9° with respect to the center line of the tire, were treated according to the teachings of the present invention. These tires were all cured at a maximum temperature of about 340° F. for about 16 to 17 minutes and were cooled to room temperature without post cure inflation. The tires were all checked on a uniformity machine and were found to have an average peak to peak composite radial force variation of at least 37 pounds. These tires were then placed vertically on a pin rack and were heated for 60 minutes at 270° F. in a horizontal pot heater with the tire positioned on the rack so that the point of maximum force was at the top. The tires were then removed from the heater, were cooled and were retested on the uniformity machine. As a result of the heat treatment, the peak to peak radial force variation was reduced an average of 7 pounds with variations in reduction ranging from 0 to 19 pounds. The first harmonic was reduced an average of 8.3 pounds. It was noted that the force variation curve after treatment was very similar to the curve obtained before treatment with the exception that the amplitude of the variations was reduced by the heat treatment.

EXAMPLE VII

An infra-red oven was used to heat-treat a number of size G78-15 polyester fiber glass belted-bias tires, all having an initial maximum radial peak to peak force variation of between 38 and 55 pounds. In the first series of tests, two groups of 36 tires each were hung on a 1½" metal pipe, and were suspended in the infra-red oven so that the area of maximum force of each tire was located in the upper quadrant of the tire. In each group, the entire circumferential tread area of the tire was heated by infra-red lamps to a surface temperature not exceeding 240° or 250° F.

The first group was heated for 10 minutes until the temperature of the inner carcass ply of each tire reached 180° F. The tires were then removed from the oven, were cooled and were retested. The average value of the peak to peak force variation was reduced about 2.5 pounds with 27 tires showing some improvement, 4 showing no change and 5 becoming worse. The average reduction in the first harmonic of these tires was 3.5 pounds with 26 tires showing some improvement.

The second group of 36 tires was heated for 15 minutes until the temperature of the inner carcass ply reached 210° F. For these tires, the peak to peak force variation was reduced 2.6 pounds and the first harmonic force variation was reduced an average of 4.8 pounds.

In a further series of tests using infra-red heat, two additional groups of 36 tires each were hung vertically on a pipe, with the phase angle at the top after which the heat from infra-red lamps was concentrated in a 60° segment of the tire, 30° on either side of the phase angle. The first group of 36 tires was heated to an inner carcass temperature of 180° F. and required 15 minutes to reach that temperature. These tires, upon retesting, showed an average reduction of 2.5 pounds in the peak to peak variation and 5.6 pounds in the magnitude of the first harmonic with 26 of the 36 showing at least some improvement. A further group of tires was heated in the same manner, but at 210° F., rather than 180° F. About 50% of these tires showed some improvement in the peak to peak variation while 31 tires showed an improvement in the first harmonic force variation.

EXAMPLE VIII

In still another series of tests, several 4-ply nylon, bias-ply passenger tires were cured and were then post-cure inflated after which they were tested for uniformity. The tires were then divided into three groups depending upon the values of the maximum peak to peak force variation, Group 1 having values between 35 and 45 pounds, Group 2 having values of between 45 and 55 pounds and Group 3 containing tires having a maximum force variation of greater than 55 pounds. These tires were mounted on a rim and were inflated to 50 p.s.i. after which they were heated vertically in an autoclave at 240° F. for 30 minutes with the point of maximum force located at the top of the tire. These tires were then allowed to cool for 20 minutes after which they were retested on a tire uniformity machine. It was found, upon retesting, that there was an average reduction in the peak to peak force variation of 13% for the first group, 22% for the second group and 40% for the third group. These tests strongly indicate that the benefits of the invention are proportional to the initial magnitude of the force variation.

Although the invention has been found to reduce the radial force variations in a large number of tires, the phenomenon accompanying the invention is not completely understood. It is felt, however, that the heat treatment of a tire produces certain stresses within the fabric of the carcass and/or breakers and these stresses contribute to non-uniformity. The subsequent heat treatment anneals the fabric and relieves some of these stresses, thereby leading to a reduction in the non-uniformity.

The importance of placing the tire in a vertical position with the maximum radial force at or near the top of the tire is believed to be at least partially due to the creep characteristics of the tire cords as perhaps affected by the pull of gravity. The creep rate of synthetic long chain polymeric cords such as polyester and nylon is greater than that of a cord made of rayon, which may explain why tires made of rayon respond more slowly during heat treatment and are less sensitive to the position of the phase angle during treatment. Because of the sensitivity to heat treatment of tires containing nylon or polyester cords care must be exercised to avoid over-correction of these tires by heating to a high temperature for too long a time. This over-correction may reduce the maximum force near the top of the tire but may cause the phase angle (i.e. the high point of the first harmonic curve) to shift and may increase the maximum force at another location of the tire thereby offsetting the beneficial effect resulting from the decrease of the original maximum force.

Furthermore, it has been observed that the type of support for the tire while it is being heat treated appears to affect the results. For instance, when the tire is supported on a hook, the entire weight of the tire is concentrated at one point, which, when practicing the teachings of the present invention, coincides with the location of the maximum force. The test results indicate a much more noticeable change in location and magnitude of these forces during heating on hooks than when the tires are heated while mounted on rims or pin racks.

As previously stated, tire non-uniformity is caused by a number of factors, only one of which relates to the condition of the tire fabric. Accordingly, it appears that the invention is directed to an improvement of one or more of the constructional characteristics of the tire that contribute to the total uniformity thereof, irrespective of the origin of each characteristic. Thus, the invention is applicable to any tire having stress conditions similar to those created by curing or post-cure inflation even though the tire itself has not been subjected to that treatment.

Although the placement of the tire so that the area of maximum non-uniformity is at the top of the tire during the heat treatment is an important feature of the invention, it should be noted that the actual uniformity measurement can be carried out on any type of machine and by any procedure that is capable of making this determination. Furthermore, it should be understood that the top of the tire means generally the upper quadrant of the tire, rather than top dead center. This upper quadrant is generally defined as the area of the tire extending circumferentially approximately 45° on either side of top dead center.

Pot heaters, rubber kilns and infra-red ovens have been specifically mentioned for use in carrying out the teachings of the present invention; however, other suitable heating ovens and vessels may also be used. A pot heater is a large pressure vessel that utilizes live steam to heat the tires. When inflated tires are heated in a pot heater, the steam pressure in the heater should not exceed the tire inflation pressure. Otherwise, the tire may become unseated from the rim.

Although the present invention does teach a method of reducing the magnitude of the radial force variations of a large percentage of tires, there is some tendency for these tires to revert in use as illustrated below.

EXAMPLE IX

Sixteen G78-15 belted-bias tires were measured for tire uniformity and were thereafter heated in a pot heater at 240° for 30 minutes while supported vertically with the phase angle at the top. The tires were again measured and a definite improvement of 21% in the peak to peak force variation was noted. The tires were then mounted on vehicles and were driven for about 50 miles after which they were removed from the vehicles and were again measured. It was found that about 30% of the initial improvement had been lost during use. However, the values were still considerably better (14% for peak to peak) than those obtained before the treatment.

The measurement of tire uniformity, per se, does not form any part of the present invention except insofar as it serves to locate the high point of the force variation curve. In fact, it is contemplated that any suitable means may be used to determine the location in the tire at which the maximum force would be generated during rotation.

The tires used in all of the previous experiments are of typical construction and are composed of a carcass or body containing two or more plies of calendered fabric, a pair of inextensible beads, sidewalls and a tread. The rubber components are typically compounded from elastomeric formulations of natural rubber, styrene-butadiene copolymer, polybutadiene rubber or combinations thereof. These formulations and components and their uses are well known in the tire building art.

The treatment of tires according to the present invention does not require the removal of any rubber from the tire to compensate for non-uniformity, but instead serves to alter the tire in such a manner as to correct the non-uniformity. Accordingly, the term treatment as used herein and as covered by this invention does not include grinding or removal or any part of the tire. It can, however, be coupled with another operation such as grinding to further improve the uniformity of the tire.

Deviations can be made in the teachings of the present invention without departing from the scope thereof which is defined by the claims wherein we claim:

1. The method of improving the uniformity of a cured pneumatic tire comprising:
   (A) locating an area of the tire where the maximum radical force would be generated if said tire were rotated against a surface
   (B) reducing the magnitude of said maximum radial force by
       (1) suspending said tire in an upright position with the area located in step (A) in the top quadrant thereof, and
       (2) maintaining said tire in said upright position at ambient temperature until the magnitude of said radial force is reduced.

2. The method of improving the uniformity of a cured pneumatic tire comprising:
   (A) locating an area of the tire where the maximum radical force would be generated if said tire were rotated against a surface
   (B) reducing the magnitude of said maximum radial force by
       (1) suspending said tire in an upright position with the area located in step (A) in the top quadrant thereof, and
       (2) heating said tire at a temperature of between about 150° to about 280° F. for a period of between about 5 to about 60 minutes.

3. The method of claim 2 wherein said tire is mounted on a rim and inflated to a pressure of not more than 50 p.s.i. during steps (B) (1) and (2).

4. The method of claim 2 wherein the tire contains cords selected from the group consisting of polyester cords and nylon cords, and the heating is carried out at a temperature of between 230° and 260° F. for a period of between about 10 and about 30 minutes.

5. The method of improving the riding characteristics of a pneumatic tire containing cords produced from a synthetic linear polymer wherein said tire has been vulcanized at elevated temperatures in a curing press, removed from the press, inflated and held in an inflated condition while cooling following vulcanization, said method comprising the steps of:
   (A) measuring the forces exerted by the inflated rotating tire under load against a surface,
   (B) locating the area of the tire at which the greatest variation in force is generated, and
   (C) heat treating the tire in a substantially vertical position with said area at the top of the tire, and at a temperature between about 150° F. and 280° F. for a period of between about 10 to about 40 minutes.

6. The method of claim 5 wherein the tire is heat treated at a temperature of not less than 180° F.

7. The method of claim 6 wherein the tire is heat treated at a temperature of between about 230° F. and about 260° F.

8. The method of claim 5 wherein said tire is mounted on a rim and inflated to a pressure of not more than 50 p.s.i. during the heat treatment step (C).

9. The method of claim 5 wherein the area at which the maximum force is generated is positioned generally in the top quadrant of the tire during the heat treatment.

10. The method of claim 9 wherein the tire is positioned no more than about 30° from the vertical during the heat treatment.

11. The method of claim 5 wherein the heat is concentrated on the area of the tire at which the maximum force is generated during said heat treating step.

12. The method of claim 5 wherein step (b) includes:
   (a) separating the force into the first and higher harmonics, and
   (b) determining the area of the tire at which the peak of the first harmonic curve is located.

References Cited

UNITED STATES PATENTS 3,017,669  1/1962  Mikell _____ 264—346

ROBERT F. WHITE, Primary Examiner

J. H. SILBAUGH, Assistant Examiner

U.S. Cl. X.R.

264—89, 100, 235, 340, 346